US012190003B2

(12) United States Patent
Pekarske et al.

(10) Patent No.: US 12,190,003 B2
(45) Date of Patent: *Jan. 7, 2025

(54) METHOD AND APPARATUS TO PROTECT SENSITIVE INFORMATION ON MEDIA PROCESSING DEVICES

(71) Applicant: ZEBRA TECHNOLOGIES CORPORATION, Lincolnshire, IL (US)

(72) Inventors: Andrew J. Pekarske, Mundelein, IL (US); James M. Rehberger, Franklin, WI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,147

(22) Filed: Aug. 7, 2023

(65) Prior Publication Data

US 2023/0384997 A1 Nov. 30, 2023

Related U.S. Application Data

(63) Continuation of application No. 17/324,808, filed on May 19, 2021, now Pat. No. 11,720,302, which is a
(Continued)

(51) Int. Cl.
*G06F 21/00* (2013.01)
*G06F 3/12* (2006.01)
(Continued)

(52) U.S. Cl.
CPC ............ *G06F 3/1238* (2013.01); *G06F 21/31* (2013.01); *G06F 21/608* (2013.01)

(58) Field of Classification Search
None
See application file for complete search history.

(56) References Cited

U.S. PATENT DOCUMENTS 6,226,749 B1    5/2001  Carloganu et al.
7,243,842 B1 *  7/2007  Leon ................ G07B 17/00508
                                                    705/401
(Continued)

FOREIGN PATENT DOCUMENTS

EP       2107453 A1    10/2009
WO    2016/122975 A1    8/2016

OTHER PUBLICATIONS

Do, Quang et al. A Data Exfiltration and Remote Exploitation Attack on Consumer 3D Printers. IEEE Transactions on Information Forensics and Security, vol. 11, Issue: 10. https://ieeexplore.ieee.org/stamp/stamp.jsp?tp=&arnumber=7487008 (Year: 2016).*
(Continued)

*Primary Examiner* — Jeremiah L Avery

(57) ABSTRACT

Methods and apparatus to protect sensitive information on media processing devices are disclosed. An example media processing device includes a processing engine configured to process a media processing instruction received at the media processing device, wherein the media processing instruction includes a command and data to cause a component of the media processing device to perform a function; and a data protector configured to determine whether the command is a data protection command; and when the command is the data protection command, modify the function to provide protection to the data.

19 Claims, 5 Drawing Sheets

Related U.S. Application Data continuation of application No. 15/914,683, filed on Mar. 7, 2018, now Pat. No. 11,048,454.

(51) Int. Cl.
  *G06F 21/31* (2013.01)
  *G06F 21/60* (2013.01)

(56) References Cited

U.S. PATENT DOCUMENTS

| | | | | |
|---|---|---|---|---|
| 7,468,724 B2* | 12/2008 | Lapstun | ............... | B65H 37/04 |
| | | | | 382/313 |
| 8,065,239 B1* | 11/2011 | McBride | ............ | G07B 17/00024 |
| | | | | 705/401 |
| 2003/0081252 A1* | 5/2003 | Silverbrook | .......... | G06Q 30/00 |
| | | | | 715/752 |
| 2004/0012812 A1 | 1/2004 | Shimizu | | |
| 2004/0156068 A1 | 8/2004 | Yoshida | | |
| 2004/0158724 A1* | 8/2004 | Carr | ............ | G06F 21/31 |
| | | | | 713/186 |
| 2005/0157083 A1* | 7/2005 | Silverbrook | ............ | B41J 15/04 |
| | | | | 347/54 |
| 2005/0200893 A1* | 9/2005 | Silverbrook | ........ | H04N 21/4223 |
| | | | | 358/1.14 |
| 2006/0259983 A1* | 11/2006 | Sperry | ............ | H04L 9/3234 |
| | | | | 726/28 |
| 2007/0016790 A1* | 1/2007 | Brundage | ............ | B42D 25/333 |
| | | | | 713/176 |
| 2007/0017985 A1* | 1/2007 | Lapstun | ............ | H04L 63/0823 |
| | | | | 235/487 |
| 2008/0149713 A1* | 6/2008 | Brundage | ............ | G07F 7/082 |
| | | | | 235/435 |
| 2010/0191866 A1 | 7/2010 | Kurogi et al. | | |
| 2011/0013224 A1 | 1/2011 | Uchida | | |
| 2014/0036524 A1 | 2/2014 | Tajima et al. | | |
| 2014/0230039 A1* | 8/2014 | Prakash | ............ | G06F 21/35 |
| | | | | 726/9 |
| 2014/0365242 A1* | 12/2014 | Neff | ............ | G16H 10/60 |
| | | | | 707/756 |
| 2015/0249770 A1 | 9/2015 | Delaney et al. | | |
| 2016/0012445 A1* | 1/2016 | Villa-Real | ............ | G06Q 20/4016 |
| | | | | 705/44 |
| 2019/0278539 A1* | 9/2019 | Pekarske | ............ | G06F 3/1238 |

OTHER PUBLICATIONS

Liu, Shufen et al. A new information leakage defendable model. 2008 9th International Conference on Computer-Aided Industrial Design and Conceptual Design. https://ieeexplore.ieee.org/stamp/stamp.jsp?tp=&arnumber=4730530 (Year: 2008).*

Othmane, Lotfi Ben; Lilien, Leszek. Protecting Privacy of Sensitive Data Dissemination Using Active Bundles. 2009 World Congress on Privacy, Security, Trust and the Management of e-Business. https://ieeexplore.ieee.org/stamp/stamp.jsp?tp=&arnumber=5341699 (Year: 2009).*

Notification of the Preliminary Search Report for French Patent Application No. 1902342 mailed on Nov. 20, 2020.

Belgian Search Report and Written Opinion Patent Application No. 2019/05129 mailed on Nov. 22, 2019.

Troyan, Oksana et al. Analysis of threats falsification falsification of printed documents. 2016 IEEE First International Conference on Data Stream Mining & Processing (DSMP). https://ieeexplore.ieee.org/stamps/stamp.jsp?tp=&amumber=7583551 (Year: 2016).

Kalochristianakis, Michael et al. The Concept and Design of an Open integrated Print Charging System. IEEE Systems Journal vol. 7, issue:4. https://ieeexplore.ieee.org/stamp/stamp.jsp?tp=&arnumber=6488715 (Year: 2013).

Computer Desktop Encyclopedia definition of "processor.": http://lookup.computerlanguage/com/host_app/search?cid=C99999&termp=processor&lookup.=0&lookup.y=0 (Year:2014).

Programming Guide for ZPLII, ZBI 2, Set-Get-Do, Mirror, and WML, Zebra Technologies Corporation, Jan. 31, 2018.

International Search Report and Written Opinion for International Application No. PCT/US2018/066782 mailed on Mar. 18, 2019.

Chiang, Pei-Ju et al. Printer and scanner forenscis. IEEE Signal Processing Magazine, vol. 26, Issue:2. https://ieeexplore.ieee.org/stamp/stamp.jsp?tp=&amumber=4806207 (Year: 2009).

Do, Quang et al. A Data Exfilitration and Remote Exploitation Attack on Consumer 3D Printers. IEEE Transactions on Information Forensics and Security, vol. 11, Issue: 10. https://ieeexplore.ieee.org/stamp/stamp.jsp?tp=&amumber=7487008 (Year: 2016).

Examination Report for Great Britain Application No. GB2013242.9 mailed on Feb. 11, 2022.

Office Action for Canadian Patent Application No. 3,090,488 mailed on Dec. 1, 2021.

* cited by examiner

| Function | Non-Sensitive | Protected | Restricted |
|---|---|---|---|
| Logging | x | redacted | redacted |
| Save Image | x | w/ Authorization | - |
| Save Format | x | w/ Authorization | - |
| Print Label | x | x | w/ Authorization |
| Encode Transponder | x | x | w/ Authorization |
| Modify/View Image | x | w/ Authorization | - |
| Modify/View Format | x | w/ Authorization | - |
| Delete Data after Use | - | x | x |
| Encrypt Data at Rest | - | x | x |

"x" = supported
"-" = unsupported

FIG. 4

METHOD AND APPARATUS TO PROTECT SENSITIVE INFORMATION ON MEDIA PROCESSING DEVICES

CROSS-REFERENCE TO RELATED APPLICATIONS

This patent application is a continuation of U.S. patent application Ser. No. 17/324,808, filed on May 19, 2021, which is a continuation of U.S. Pat. No. 11,048,454, filed on Mar. 7, 2018. The contents of each are hereby incorporated by reference herein in their entirety.

FIELD OF THE DISCLOSURE

This disclosure relates generally to media processing devices and, more particularly, to methods and apparatus to protect sensitive information on printers.

BACKGROUND

A printer is an example type of media processing device that receives data (e.g., from a network) and generates indicia on media (e.g., by printing the indicia on a surface of the media) in accordance with the received data. Additionally or alternatively, the printer reads from and/or writes to machine-readable memory embedded in the media in accordance with the received data (e.g., by reading from and/or writing to a chip of a radio frequency identification (RFID) transponder. In some instances, one or more portions of the received data is representative of sensitive information.

BRIEF DESCRIPTION OF THE DRAWINGS

FIG. 4 is a table representative of example protective functions provided by the example data protector of FIGS. 2 and/or 3.

DETAILED DESCRIPTION

Figure 1:
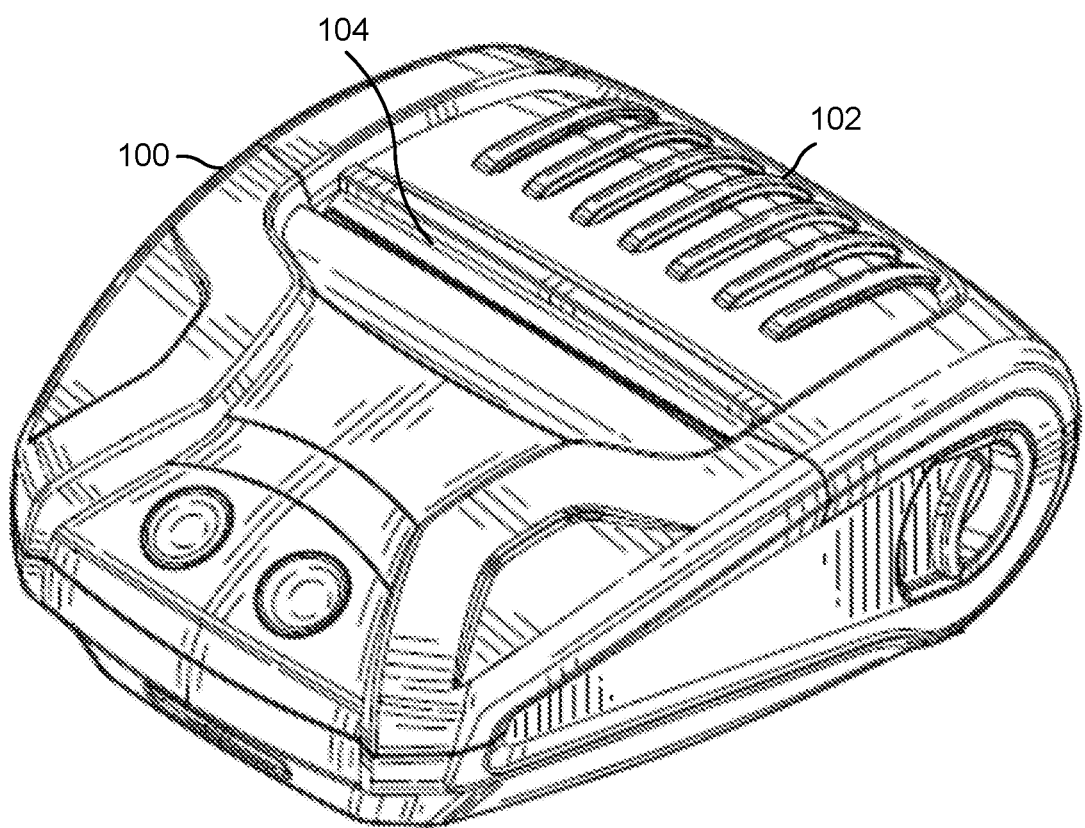
FIG. 1 is a perspective view of an example media processing device constructed in accordance with teachings of this disclosure.

Teachings of this disclosure are described herein in connection with media processing devices. However, teachings of this disclosure are applicable to any suitable type of device that performs one or more operations involving data. For example, while teachings of this disclosure are described below in connection with printers and data associated with printer components, teachings of this disclosure may be implemented in scanners that image and interpret machine-readable indicia (e.g., barcodes, QR codes, codes stored on radio frequency identification (RFID) transponders), mobile computers that communicate and display information, automatic teller machines (ATMs), kiosks, point-of-sale devices, and/or any other type of device that processes, stores and/or communicates data.

A printer is an example type of media processing devices (MPD) configured to receive media processing instructions and to execute one or more operations in accordance with the media processing instructions. An example type of media processing instruction is a print instruction. Some printers are configured to receive print instructions, render an image according to the print instructions, store the rendered image, and print the rendered image onto media. For example, a thermal barcode printer receives print instructions for a label including barcode and/or text, renders an image of the barcode and/or text in accordance with the print instructions, stores the rendered image of the barcode and/or text, and generates the image as indicia on media via thermal transfer printing techniques or direct thermal printing techniques.

The print instructions include commands (e.g., field commands, format commands, settings commands, and status commands) and data. For some types of commands, such as field data commands, the accompanying data is representative of information such as, for example, a name, a product number, a product code, a date, a credit card number, a transaction number, a tracking number, an address, a phone number, or a social security number. For example, in Zebra Programming Language (ZPL), ^FD is a field data command indicating that field data for a field will follow. The Programming Guide for ZPLII, ZBI 2, Set-Get-Do, Mirror, and WML©, Zebra Technologies Corporation, Jan. 31, 2018, is hereby incorporated herein by reference. An example print instruction including a field data command and the corresponding data is:

^FDJohn Smith where "^FD" is the field data command and "John Smith" is field data.

Another example type of print instruction is a format command. For format commands, the accompanying data controls an aspect of a print format. For example, in ZPL, ^ADN is a format command indicating that a font size will follow. An example print instruction including a format command and the corresponding format data is:

^ADN,36,20 where "^AND" is a format command and "36,20" is format data.

The printer interprets the print instructions to render an image that includes the field data according to the format. Other example format commands in ZPL are ^XA to indicate a start of a format, ^FO to indicate a location origin for the format, ^FS to separate fields, and ^XZ to indicate an end of a format. For example, to cause the printer to render an image including the text string "John Smith" of font size "36,20" at location "50,50" of a coordinate layout, the following print instructions are sent to the printer:

^XA
^FO50,50^ADN,36,20^FDJohn Smith^FS
^XZ

As described in detail below, the printer includes a processing engine to render an image according to the print instructions.

Another example type of media processing instructions is an encode instruction. Some printers are configured to receive encode instructions and read/write to, for example, an RFID transponder embedded in media loaded into the printer. The encode instructions include commands (e.g., write commands, read commands, read/write commands) and data. For some types of encode instructions, the accompanying data is representative of information such as, for example, a name, a product number, a product code, a date, a credit card number, a transaction number, a tracking number, an address, a phone number, or a social security number. For example, in ZPL, ^RF is a read/write command indicating that field data for a read/write operation will follow. An example encode instruction including a read/write command and field data is:

^RFw^FDJohn Smith where "^RF" is the read/write data command, "w" indicates that the operation is to write (rather than read), ^FD is the field data command, and "John Smith" is field data.

Another example type of encode instruction is a setup command. For setup commands, the accompanying data controls a value of a setting. For example, in ZPL, ^RS is a setup command indicating that type of RFID transponder will follow. An example encode instruction including a setup command is:

^RS8 where "^RS" is a setup command and "8" is setup data. The printer interprets the encode instruction to encode an RFID transponder. For example, to cause the printer to write the text string "John Smith" to an EPC Class 1, Gen 2 tag, the following encode instructions are sent to the printer:

^XA
^RS8
^RFw^FDJohn Smith^FS
^XZ

As described in detail below, the printer includes a transceiver to encode the RFID transponder according to the encode instructions.

Depending on the environment and tasks to which the printer is assigned, data to be processed by the printer, such as field data and/or format data, may be representative of sensitive information. For example, field data received at the printer may include personally identifiable information (PII) (e.g., social security numbers), healthcare-related information, and/or financial transactions details. Additionally or alternatively, format data received at the printer may include formatting aspects that an entity considers confidential. While network devices (e.g., routers and servers associated with a wired local network (LAN), a wireless LAN, and/or a cellular network) and other machines (e.g., a handheld mobile computer, a laptop, and/or a desktop computer) that transfer data to the printer may provide one or more security measures (e.g., firewalls, virtual private network protections, encryption, secure protocols transfers, etc.) to protect the transfer of the media processing instructions to the printer, example systems, methods and apparatus disclosed herein enhance an ability of the printer (and any other suitable MPD) to secure and protect data (e.g., field data, format data, etc.) when, for example, a user has indicated that the corresponding media processing instructions include sensitive information.

In particular, example systems, methods, and apparatus disclosed herein enable the printer (and any other suitable MPD) to distinguish between data associated with sensitive information and other data associated with non-sensitive information. The sensitivity of the information is determined by, for example, designations made by a user and/or machine associated with the data. As described in detail below, examples disclosed herein provide specific commands to enable users and/or machines to designate particular media processing instructions as including or otherwise associated with sensitive information.

Moreover, to provide one or more measures of protection over sensitive information, example systems, methods, and apparatus disclosed herein enable the printer to handle the data associated with sensitive information differently than the data associated with non-sensitive information. In particular, examples disclosed herein provide protective functions that alter one or more behaviors of the printer when sensitive information is encountered (e.g., received and/or processed at the printer).

As an example protective function disclosed herein, when sensitive print information is encountered in connection with a print instruction, the printer prohibits use of the corresponding data for any purpose other than printing. That is, the printer prints the sensitive print information on a label and deletes and securely wipes (e.g., completely erases from memory) the data representative of the sensitive information immediately following the printing operation such that the data cannot be accessed (e.g., read and/or retrieved) from the printer subsequent to the printing operation. In contrast, when non-sensitive information is encountered, the printer stores the corresponding data for access subsequent to printing. As such, storage of data on the printer subsequent to printing is executed differently for sensitive information than non-sensitive information.

As another example protective function disclosed herein, when sensitive information is encountered in connection with an encode instruction, the printer prohibits use of the corresponding data for any purpose other than encoding. That is, the printer encodes (e.g., wirelessly writes) the sensitive information to memory embedded in media and deletes the data representative of the sensitive information immediately following the encoding operation (e.g., write) such that the data cannot be accessed or retrieved from the printer subsequent to the encoding operation. In contrast, when non-sensitive information is encountered, the printer stores the corresponding data for access subsequent to encoding. As such, storage of data on the printer subsequent to encoding is executed differently for sensitive information than non-sensitive information.

As another example protective function disclosed herein, when sensitive information is encountered, the printer deletes or redacts portions of a tracking log (e.g., a text file that tracks operations performed by the printer) associated with the sensitive information. In contrast, when non-sensitive information is encountered, the printer maintains the full tracking log. As such, record keeping is differently executed by the printer when handling sensitive information relative to non-sensitive information.

As another example protective function disclosed herein, when sensitive information is encountered, the printer denies requests to modify a format of the corresponding print job and/or an image that was rendered based on the corresponding data. Additionally, when sensitive information is encountered, the printer logs (e.g., records in memory) any unauthorized attempt to modify a format or otherwise access sensitive information, along with details associated with the attempts such as, for example, a date, a time, and a user identity. In contrast, when non-sensitive information is encountered, the printer allows requests to modify the format and/or the image. As such, the ability to modify data associated with print operations is controlled differently for sensitive information than non-sensitive information. Other example protective functions provided by teachings of this disclosure are described in detail below.

To enable users and/or machines providing data to the printer to inform the printer of the presence of sensitive information, examples disclosed herein provide new commands to be sent to the printer in conjunction with sensitive data, such as field data and/or format data. The new commands disclosed herein are collectively referred to herein as data protection commands. The data protection commands provided by teachings of this disclosure are included in media processing instructions when a generator (e.g., author or machine) of the media processing instructions considers the associated information to be sensitive and desires protective measures to be taken in connection with the corresponding data. That is, when a user (e.g., a person or machine) is preparing media processing instructions that include data representative of sensitive information (e.g., PII, details of a financial transaction, or any type of information considered sensitive by the use), examples disclosed herein enable the user to include one or more of the data protection commands to inform the printer that the corresponding data is to be protected via one or more of the protective functions disclosed herein.

In some examples disclosed herein, a plurality of data protection commands is made available to accommodate information of varying levels of sensitivity and, thus, varying levels of protective functionality over the corresponding data. For example, a first one of the data protection commands can be used for highly sensitive information, and a second one of the data protection commands can be used for less sensitive information. When the printer receives data (e.g., field data or format data) with the first one of the data protection commands, the printer executes a first set of one or more protective functions. When the printer receives data (e.g., field data or format data) with the second one of the data protection commands, the printer executes a second set of one or more protective functions. In some examples, the first set of protective function(s) at least partially overlaps with the second set of protective function(s).

Accordingly, examples disclosed herein improve MPDs by enabling users to designate particular data as sensitive and by providing protective functions executable by the MPD to handle the sensitive data in a desired manner.

FIG. 1 illustrates an example MPD 100 constructed in accordance with teachings of this disclosure. The example MPD 100 illustrated in FIG. 1 is a printer. However, as described above, teachings of this disclosure are applicable to any device configured to receive data and to perform one or more operations based on the data. The example MPD 100 of FIG. 1 includes a media cover 102 configured to open and close. With the media cover 102 open, thermal media is loaded into a media receiving area of the example MPD 100 and the media cover 102 is closed, thereby protecting the media from the external environment. In illustrated example of FIG. 1, the thermal media includes dye that changes color (e.g., from white to black, from clear to black, etc.) in response an application of energy (e.g., heat) to the thermal media.

The example MPD 100 includes communication ports (e.g., one or more wired interfaces and one or more wireless interfaces) configured to receive media processing instructions that cause the MPD 100 to process media present in the media receiving area. For example, the media processing instructions may be print instructions (e.g., ZPL) that include format commands and field data for a barcode and/or text to be printed on a label. Additionally or alternatively, the media processing instructions may be encoding instructions that include encoding commands and field data to be written to a radio frequency identification (RFID) transponder embedded in the media.

The example MPD 100 of FIG. 1 includes a processor to receive and execute the media processing instructions to cause media processing components of the MPD 100 to, for example, generate an image on the thermal media and/or write data to an RFID transponder embedded in the thermal media. In particular, the MPD 100 includes a media conveyance system that drives the thermal media from the media receiving area to one or more media processing areas such as, for example, an encoding area and a print area. The media encoding area includes a transceiver to wirelessly read and/or write data to, for example, RFID transponders embedded in the thermal media. The print area includes a thermal printhead to apply heat to portions of the thermal media. The thermal printhead of the MPD 100 includes a plurality of heating elements (i.e., dots) arranged in rows. The heating elements of the printhead are individually selectable such that subsets of the heating elements are active at a time, thereby enabling the printhead to generate an image of the thermal media. While the example MPD 100 of FIG. 1 is a direct thermal printer, alternative printing techniques include thermal transfer printing technology and dye-sublimation thermal printing technology. After being processed (e.g., encoded and/or printed), the thermal media is moved by the media conveyance system to a media exit 104 from which a leading portion of the media can be removed from the MPD 100. In the illustrated example, media that has been encoded and/or printed by the MPD 100 is considered to be processed media.

Figure 2:
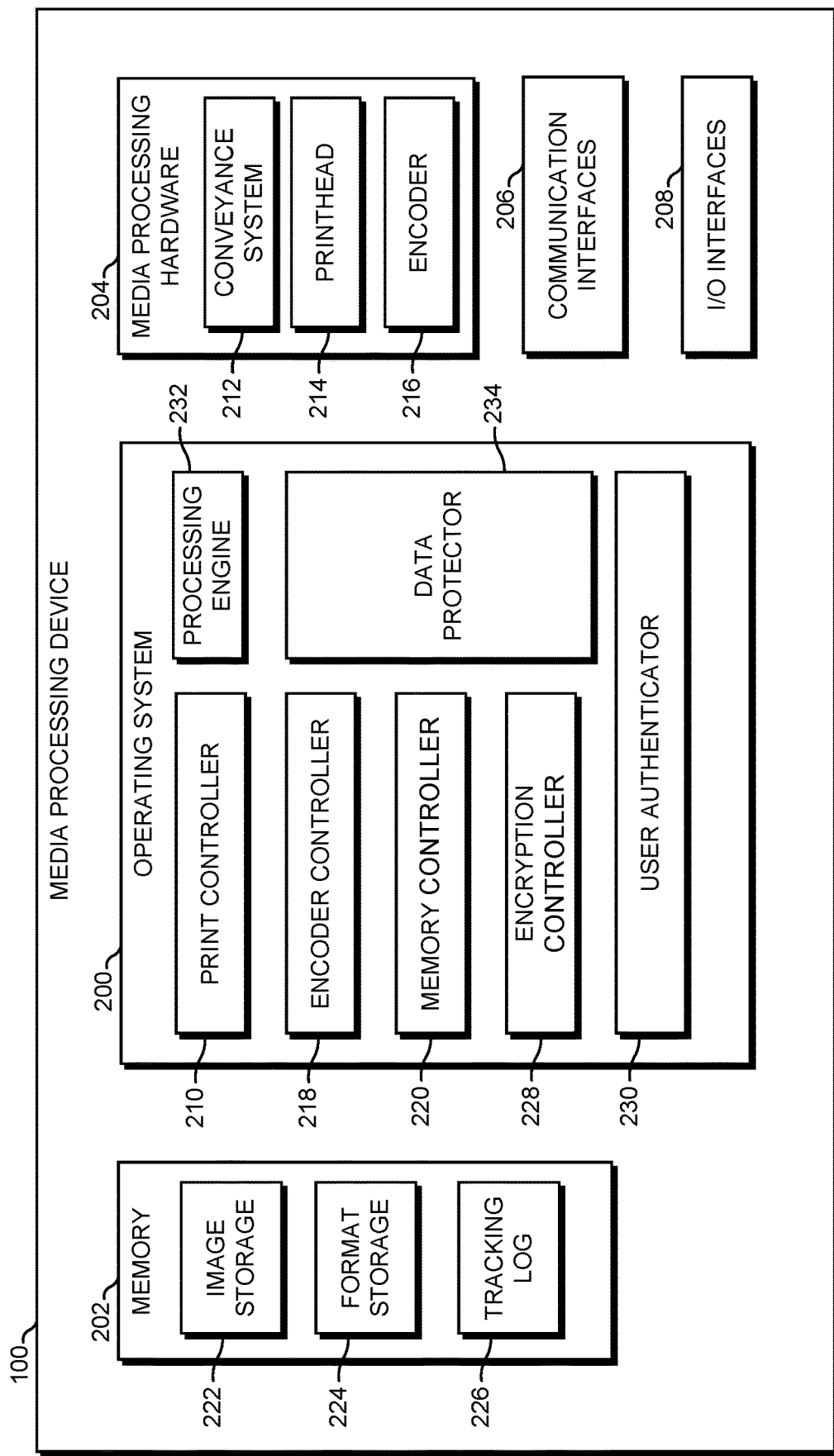
FIG. 2 is a block diagram representation of the example media processing device of FIG. 1 including a data protector constructed in accordance with teachings of this disclosure.

FIG. 2 is a block diagram representation of the example MPD 100 of FIG. 1. The example MPD 100 of FIG. 2 includes an operating system 200 configured to control components of the MPD 100. In particular, the example operating system 200 of FIG. 2 controls and/or interacts with memory 202, media processing hardware 204, communication interfaces 206, and input/output interfaces 208. In the illustrated example of FIG. 2, the operating system 200 is executed by a logic circuit (e.g., one or more processors, microprocessor(s), coprocessor(s) and/or integrated circuit(s) (e.g., an ASIC (application specific integrated circuit), or an FPGA (field programmable gate array)).

The example operating system 200 of FIG. 2 includes a print controller 210 configured to control components of the media processing hardware 204 associated with generation of indicia on media loaded in the MPD 100. In the example of FIG. 2, the print controller 210 controls a media conveyance system 212 to delivery units (e.g., labels) of the media to a printhead 214. The media conveyance system 212 includes a motor, one or more drive elements driven by the motor that engage the media, and sensors to detect a position and/or status of the media. The example print controller 210 controls the motor to pull the media via the one or more drive elements, such as a platen, to a print area in which the printhead 214 generates indicia on the media unit currently located in the print area.

The example printhead 214 of FIG. 2 includes a plurality of heating elements that are referred to as dots. Activation of individual ones the dots are controlled by a printhead driver, which is implemented via a logic circuit in communication with the dots. For example, the printhead driver is implemented as a programmable gate array or by a processor capable of executing machine-readable instructions stored in memory. In accordance with signals received from the print controller 210, the printhead driver selectively energizes the dots of the printhead 214 to cause a change in appearance of the media fed across the printhead 214 by the media conveyance system 212. The dots of the example printhead 214 are linearly arranged. Based on the content to be printed, different dots for a given line may be turned on or off. For example, if a solid line is to be printed across the media, then all of the dots of the printhead 214 are turned on to print that line as a solid line of dot images. Each line of a given print job may be printed by moving the media (e.g., via the media conveyance system 212), relative to the printhead 214 and changing which dots are turned on and which does are turned off. The speed at which the media is printed is often measured in inches per second (ips).

In the illustrated example, the MPD 100 is configured for direct thermal printing (e.g., labels including heat-sensitive dye(s)). As such, direct thermal media is loaded into the MPD 100. Direct thermal print media is designed and manufactured such that when a threshold amount of energy is applied to a surface of the media, a chemical reaction occurs in the media that causes a change in appearance (e.g., a change in color from white to black). In the example of FIG. 2, the direct thermal media is fed from a media receiving area to the printhead 214 via the conveyance system 212. The printhead 214 selectively applies heat directly to the direct thermal media fed across the printhead 214, thereby causing a change in appearance of the media at selective locations on the direct thermal media. Depending on the type of media, a threshold number of joules per square inch or Watt*seconds per square inch is needed for a chemical reaction to occur in the direct thermal media to thereby cause a change in appearance of one or more portions of the media. The example MPD 100 may be configured for additional or alternative printing techniques such as, for example, thermal transfer printing.

The example operating system 200 of FIG. 2 includes an encoder controller 218 to control operations of the encoder 216. In the illustrated example, the encoder 216 includes one or more transceivers to wirelessly read and/or write data to, for example, RFID transponders embedded in the media. For example, an encode instruction may cause the encoder controller 218 to control the encoder 216 to wirelessly couple to an antenna of an RFID transponder in the encoding area and to communicate data received with the encode instruction to the RFID transponder. Additionally or alternatively, an encode instruction may cause the encoder controller 218 to control the encoder 216 to wirelessly couple to the antenna of an RFID transponder in the encoding area to read data stored on the RFID transponder. In the illustrated example, the encoder controller 218 and the example encoder 216 are implemented by, for example, methods and apparatus disclosed in U.S. Pat. No. 8,878,652, filed Nov. 13, 2009, granted Nov. 4, 2014, which is hereby incorporated herein by reference in its entirety.

The example operating system 200 of FIG. 2 includes a memory controller 220 to control operations associated with the memory 202, which includes image storage 222, format storage 224, and a tracking log 226. In the illustrated example, each of the image storage 222, the format storage 224, and the tracking log 226 is an address space in the memory 202. However, the individual elements of the memory 202 may be stored in any suitable arrangement or data structure.

When print instructions are received and a corresponding image is rendered, for a print job, the example memory controller 220 conveys the image to the image storage 222, from which the image(s) can be subsequently retrieved. Alternatively, the MPD 100 may receive one or more images for a print job directly from an external device. In such instances, the example memory controller 220 receives the one or more images via, for example, one of the communication interfaces 206 and conveys the received image(s) to the image storage 222. Additionally, the example memory controller 220 conveys format data for the print job to the format storage 224, from which the format storage 224 can be subsequently retrieved. Alternatively, the MPD 100 may receive one or more formats directly from an external device. In such instances, the example memory controller 220 receives the one or more formats via one of the communication interfaces 206 and conveys the received format(s) to the format storage 224.

In the example of FIG. 2, the memory controller 220 of FIG. 2 maintains the tracking log 226. In some instances, the memory controller 220 cooperates with other components, (e.g., the print controller 210 and/or the encoder controller 218) to track operations and the corresponding data for storage in the tracking log 226. In particular, when the print controller 210 and/or the encoder controller 218 cause the media processing hardware 204 to execute particular operations that the memory controller 220 is configured to log, the memory controller 220 logs (e.g., adds the operation and the corresponding data to a data structure, such as a list) the corresponding information in the tracking log 226. In some examples, data of the tracking log can be retrieved from the memory 202 via, for example, one or more of the communication interfaces 206 and/or one or more of the I/O interfaces 208.

The example operating system 200 of FIG. 2 includes an encryption controller 228 configured to apply one or more encryption protections to data stored in the memory 202. In some examples, the encryption controller 228 adds password protections to one or more pieces of data in the memory 202. Additionally or alternatively, the example encryption controller 228 encrypts groups of data such as, for example, the entire tracking log 226 or a segment of the tracking log 226. To encrypt data, the example encryption controller 228 implements one or more encryption algorithms such as, for example, Advanced Encryption Standard 128 (AES-128), AES-256, and/or any other suitable encryption algorithm. In some examples, the encryption controller 228 interacts with the I/O interfaces 208 to obtain a password from, for example, a user and modifies aspects of the memory 202 to require the password for subsequent access. In some instances, such as when data arrives at the media processing device 100 in an encrypted form, a session decryption key is securely delivered (e.g., over an authenticated or otherwise secured connection) to the media processing device 100 and stored securely in the memory 202.

The example operating system 200 of FIG. 2 includes a user authenticator 230 to determine an identity of a user of the MPD 100. In the illustrated example, the user authenticator 230 interacts with one or more of the I/O interfaces 208 to receive data provided by the user. In the example of FIG. 2, the I/O interfaces 208 include a keypad, a touchscreen and an RF-based wireless communication module. The keypad and the touchscreen are configured to receive manual input from the user such as, for example, an engagement of a button or icon. As such, the user can use the keypad and/or touchscreen to provide, for example, a user identification number and password. In the illustrated example, the RF-based wireless communication module is a near-field communication (NFC) module including a transceiver to communicate in a near field proximate the MPD 100. As such, the user can place an NFC card in the near field of the transceiver to communicate with the NFC module. In some instances, the NFC card includes a user identification number, password, and/or key.

The example user authenticator 230 of FIG. 2 processes the received input to determine an identity of the user and an authority level of the user with respect to the MPD 100. For example, the user authenticator 230 compares received user identification numbers and passwords to determine whether the MPD 100 is aware of the user and has authorized the user to use the MPD 100. Additionally or alternatively, the user authenticator 230 determines whether a provided key is authentic (e.g., corresponds to an issued authentication key).

The user authenticator 230 maintains a list of persons and their corresponding authority level in, for example, the memory 202. As described below, different functions of the MPD 100 may be available to some authorized users while other functions of the MPD 100 are not. For example, a user of a first authority level may be able to print a label including sensitive information, while another user of a second authority level is prevented from printing such a label.

The example operating system 200 of FIG. 2 includes a processing engine 232 to process media processing instructions received at the MPD 100 via the communication interfaces 206, which are implemented by, for example, wired and/or wireless communication ports. As described above, the media processing instructions include commands and data that are interpreted by the processing engine 232 to carry out the instructions. For example, when the processing engine 232 receives print instructions, the processing engine 232 renders an image in accordance with the commands and the accompanying data. The image is used by the print controller 210 to cause the media processing hardware 204 to generate indicia on media in the form of the image. When the processing engine 232 receives encode instructions, the processing engine 232 provides corresponding data to the encoder controller 218, which controls the encoder 216 to communicate with, for example, an RFID transponder in the media. Thus, the processing engine 232 is configured to interpret the received media processing instructions such that the operating system 200 can carry out the corresponding operations. In the illustrated example of FIG. 2, the processing engine 232 is configured to understand ZPL instructions and, in the illustrated example of FIGS. 2-5 and the corresponding descriptions below, data protection commands disclosed herein are in ZPL format. However, the example processing engine 232 is configured to understand additional programming languages such as, for example, Eltron Programming Language (EPL), Extensible Markup Language, Set-Get-Do (SGD), Comtec Printer Control Language (CPCL), JavaScript Object Notation, Hypertext Markup Language (HTML), and/or one or more internal application programming interfaces (APIs).

In some examples, the processing engine 232 communicates with the memory controller 220 such that the memory controller 220 can perform one or more operations using the data generated by the processing engine 232. For example, the memory controller 220 may receive the image rendered by the processing engine 232 and/or encoding data rendered by the processing engine 232 and may store the same in a suitable area of the memory 202.

The example operating system 200 of FIG. 2 includes a data protector 234 configured in accordance with teachings of this disclosure. The example data protector 234 is configured to recognize data protection commands disclosed herein. As described above, examples disclosed herein include data protection commands that enable users (e.g., persons and/or machines) to designate certain data as representative of sensitive information. In the illustrated example, the data protector 234 is configured to recognize data protection commands in ZPL. However, the example data protector 234 can be configured to recognize data protection commands in any suitable language or protocol. That is, the data protection commands disclosed herein are language agnostic in that the data protection commands and the benefits thereof can be tailored or configured for any suitable programming language or protocol.

When the example data protector 234 of FIG. 2 recognizes a data protection command in media processing instructions received at the MPD 100, the data protector 234 implements one or more of the protective functions disclosed herein. In the illustrated example, the data protector 234 receives the media processing instructions in parallel, after or before the processing engine 232 such that the media processing instructions can be analyzed by the data protector 234.

Figure 3:
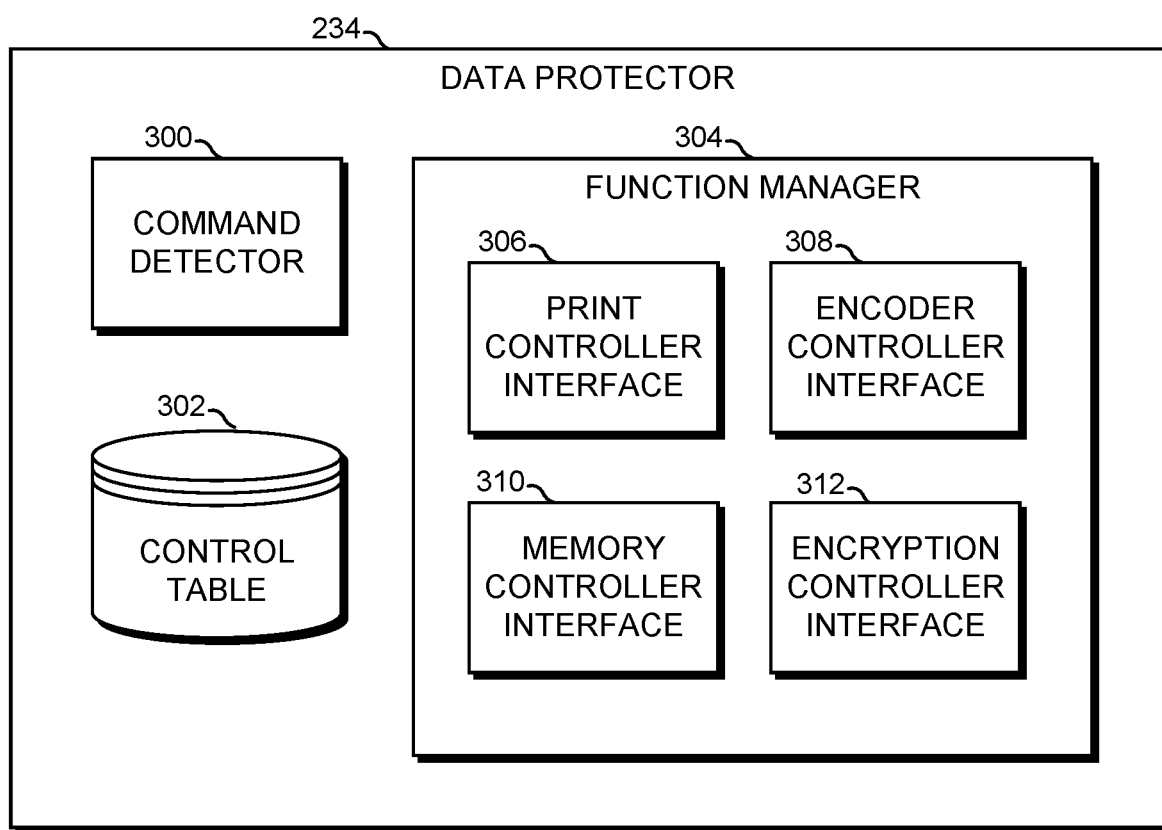
FIG. 3 is a block diagram representative of an example implementation of the data protector of FIG. 2.

An example implementation of the data protector 234 is illustrated in FIG. 3. The example data protector 234 of FIG. 3 includes a command detector 300, a control table 302, and a function manager 304. In the illustrated example, the command detector 300 is configured to analyze media processing instructions received at the MPD 100 and to determine whether any of the media processing instructions include a data protection command. The example command detector 300 of FIG. 3 is configured to detect a first data protection command referred to as a protected data command, and to detect a second type of data protection command referred to as a restricted data command. The command detector 300 detects the protected data command by recognizing the following characters in media processing instructions:

^PD

The command detector 300 detects the restricted data command by recognizing the following characters in media processing instructions:

^RD

While the above characters are example characters for the data protection commands disclosed herein, any other suitable characters can be used to enable the user to designate a media processing instruction as including sensitive information.

If a generator (e.g., author) of media processing instructions corresponding to, for example, a label including sensitive information want the MPD 100 to protect the associated data in a first protective manner, ^PD is used in a print instruction in lieu of, for example, ^FD. For example, if the label is to include a social security number (SSN) and the SSN is considered to be sensitive information, one of the following print instruction may be used, depending on the desired level and/or type of protection:

^PD SSN:########## ^FS, where "^PD" is the protected data command and "SSN:##########" is the protected data, or

^RD SSN:########## ^FS where "^RD" is the restricted data command and "SSN:##########" is the restricted data.

Notably, the protected data command (^PD) or the restricted data command (^RD) is used in lieu of, for example, the field data command (^FD). Thus, the command detector 300 recognizes either the protected data command (^PD) or the restricted data command (^RD) as indicative of sensitive information and other types of commands, such as the field data command (^FD), as indicative of non-sensitive information.

When the example command detector 300 of FIG. 3 determines that a data protection command (e.g., ^PD or ^RD) is encountered, the command detector 300 queries the control table 302 with a type of the detected data protection command. An example instance of the control table 302 is shown in FIG. 4. While the example control table 302 of FIG. 4 is stored on the MPD 100, the MPD 100 may communicate with a remote device via, for example, a network to obtain the information of the control table 302.

The example control table 302 lists a plurality of functions performed by components of the MPD 100. Depending on the type of command detected by the example command detector 300, the control table returns values for the different functions, where each of the values is indicative of whether the respective function is supported, unsupported, supported with authorization, or supported but with condition(s). A supported function is one that is allowed to execute in connection with the corresponding command or a print job (e.g., a print label job and/or an encode label job) to which the command belongs. An unsupported function is one that is prohibited from execution in connection with the corresponding command or a print job to which the command belongs. A function that is supported with authorization is one that is supported only when a user of the MPD 100 is authenticated by, for example, the user authenticator 230 of FIG. 2. A function that is supported but with condition(s) is one that is supported with one or more aspects of the function being prohibited. In the illustrated example, one such prohibition is only providing a redacted version of data stored in the memory 202 of the MPD 100. That is, certain portions of data are deleted before storing the data to the memory 202.

As shown in the example control tale 302 of FIG. 4, the protected data command is more protective than commands associated with non-sensitive information, and the restricted data command is more protective than the protected data command.

In response to the query from the command detector 300, the control table 302 returns a plurality of values for the functions according to the type of command provided to the control table 302. Thus, when the command detector 300 queries the control table 302 with a protected data command (^PD), the control table 302 returns the values shown in the "Protected" column of the table shown in FIG. 4. Further, when the command detector 300 queries the control table 302 with a restricted data command (^RD), the control table 302 returns the values shown in the "Restricted" column of the table shown in FIG. 4. In some examples, when the command detector 300 does not detect a data protection command, the command detector 300 queries the control table 302 with a non-sensitive indicator and the control table returns the values shown in the "Non-Sensitive" column of the table shown in FIG. 4. Alternatively, when the command detector 300 does not detect a data protection command, the command detector 300 does not query the control table 302, but instead obtains a default set of values for the functions and provides the same to the operating system 200. Alternatively, when the command detector 300 does not detect a data protection command, the command detector 300 indicates as such to the operating system 200 such that default or current functionalities are maintained. That is, when the command detector 300 does not detect a data protection command, the data protector 234 does not modify any functionality of the MPD 100.

The example command detector 302 conveys the received values to the function manager 304, which includes a plurality of interfaces to, depending on the received values from the control table 302, modify the behavior of one or more of the components of the MPD 100, such as components of the operating system 200.

In the illustrated example, the function manager 304 includes a print controller interface 306 configured to, when certain data protection command(s) are detected by the command detector 300, modify one or more operations associated with the print controller 210 of FIG. 2 which, as described above, controls at least the conveyance system 212 and the printhead 214. According to the example control table 302 of FIG. 4, when either a non-sensitive command (e.g., the field data command (^FD)) or the protected data command is detected, the print controller interface 306 causes the print controller 210 to enable printing. That is, the print function is not affected by the protected data command in the example of FIG. 4. However, when the restricted data command is detected, the printer controller interface 306 causes the print controller 210 to require a user to be authenticated to print a label at the MPD 100. For example, the print controller 210 may require the user to insert a removable storage device (e.g., a flash drive) into one of the communication interfaces 206 (e.g., a USB port) or to enter a username and password using one of the I/O interfaces 208. If the user is authenticated, printing in connection with the restricted data command is allowed. If the user fails the authentication, printing in connection with the restricted data is prohibited.

In the illustrated example, the function manager 304 includes an encoder controller interface 308 configured to, when certain data protection command(s) are detected by the command detector 300, modify one or more operations associated with the encoder controller 218 of FIG. 2 which, as described above, controls at least the encoder 216. According to the example control table 302 of FIG. 4, when either a non-sensitive command (e.g., the field data command (^FD)) or the protected data command is detected, the encoder controller interface 308 causes the encoder controller 218 to enable read/write operations of the encoder 216. That is, the read/write function is not affected by the protected data command in the example of FIG. 4. However, when the restricted data command is detected, the encoder controller interface 308 causes the encoder controller 218 to require a user to be authenticated to read/write a transponder in the MPD 100. For example, the encoder controller 218 may require the user to insert a removable storage device (e.g., a flash drive) into one of the communication interfaces 206 (e.g., a USB port) or to enter a username and password using one of the I/O interfaces 208. If the user is authenticated, performance of read/write operations in connection with the restricted data command is allowed. If the user fails the authentication, performance of read/write operations in connection with the restricted data is prohibited.

In the illustrated example, the function manager 304 includes a memory controller interface 310 configured to, when certain data protection command(s) are detected by the command detector 300, modify one or more operations associated with the memory controller 220 of FIG. 2 which, as described above, controls access to and operations associated with the memory 202. According to the example control table 302 of FIG. 4, when a non-sensitive command (e.g., the field data command (^FD)) is detected, the memory controller interface 310 does not affect a logging function of the memory controller 220 and, thus, the memory controller 220 fully logs data in the tracking log 226. Further, when either the protected data command or the restricted data command is detected, the memory controller interface 310 causes the memory controller 220 to store a redacted version of the log function in the tracking log 226. In particular, the memory controller interface 310 instructs the memory controller 220 to redact data that accompanied the protected data command or the restricted data command such as, for example, personally-identifiable information.

According to the example control table 302 of FIG. 4, when a non-sensitive command is detected, the memory controller interface 310 does not affect an image saving function or a format saving function of the memory controller 220 and, thus, the memory controller 220 saves a corresponding image (e.g., an image received at the MPD 100 or rendered by the processing engine 232. When the protected data command is detected, the memory controller interface 310 causes the memory controller 220 to require authorization for storage of the image or the format to occur. When the restricted data command is detected, the memory controller interface 310 causes the memory controller 220 to prohibit storage of the image and to prohibit storage of the format. That is, local storage of the image and local storage of the format is not allowed when the restricted data command is encountered.

In some examples, the example modifications to functions performed by the memory controller 220 apply to each type of memory implemented in the media processing device 100. Alternatively, in some examples, when the protected data command and/or the restricted data command is detected and the corresponding function is to store the corresponding data, the memory controller interface 310 causes the memory controller 220 to store the data in volatile memory, as opposed to non-volatile memory in which data corresponding to non-sensitive information is stored.

Additionally or alternatively, when the protected data command and/or the restricted data command is detected and the corresponding function is to store the corresponding data, the memory controller interface 310 causes the memory controller 220 to store the data in within memory block having enhanced protective features, such as, for example, an Elliptic Curve Digital Signature Algorithm (ECDSA) protected cryptographic memory chip, a secure file system, and/or an encrypted file system.

According to the example control table 302 of FIG. 4, when a non-sensitive command is detected, the memory controller interface 310 does not affect memory access functions of the memory controller 220, specifically a first access function that enables a user to modify or view the image and a second access function that enables a user to modify or view the format. Thus, the memory controller 220 provides access to stored images and to stored formats when the corresponding media processing instruction did not include a data protection command. In contrast, when the protected data command is detected, the memory controller interface 310 causes the memory controller 220 to require authorization for modifying or viewing stored images and for modifying or viewing stored formats. When the restricted data command is detected, the memory controller interface 310 causes the memory controller 220 to prohibit modifying or viewing stored images and to prohibit modifying or viewing stored formats.

According to the example control table 302 of FIG. 4, when a non-sensitive command is detected, the memory controller 220 does not allow deletion of the corresponding data after the media processing operations caused by the corresponding instructions have been performed. In contrast, when either the protected data command or the restricted data command is detected, the memory controller interface 310 causes the memory controller 220 to delete the data associated with, for example, a print job after the corresponding print operations have been performed. As such, the memory controller interface 310 enables the MPD 100 to delete data immediately subsequent to (e.g., within a second or less) a printing operation and/or an encoding operation. Thus, data representative of sensitive information is not stored on the MPD 100 for a significant period of time, thereby preventing unauthorized access to the sensitive information.

The example function manager 304 of FIG. 3 includes an encryption controller interface 312 configured to, when certain data protection command(s) are detected by the command detector 300, modify one or more operations associated with the encryption controller 228 of FIG. 2 which, as described above, encrypts data stored in the memory 202. According to the example control table 302 of FIG. 4, when a non-sensitive command (e.g., the field data command (AFD)) is detected, the encryption controller interface 312 does not allow the encryption controller 228 to encrypt data at rest. In contrast, when either the protected data command or the restricted data command is detected, the encryption controller interface 312 causes the encryption controller 228 to encrypt the corresponding data. In the illustrated example, the encryption controller interface 312, causes the memory encryption controller 228 to encrypt the data when the data is not being used (e.g., at rest and not being processed by the processing engine 232). When the data is being used, the data is unencrypted by the encryption controller 228 as needed for as short of a duration as possible. In some examples, the encryption controller interface 312 causes the encryption controller 228 or the memory controller 220 to erase portion(s) of the memory 202 at which the data was stored before being unencrypted. The example encryption controller interface 312 causes the encryption controller 228 to encrypt the data again after the data is used (e.g., processed by the processing engine 232) and stored at a different location in the memory 202. In some examples, the encryption controller interface 312 causes the encryption controller 228 to encrypt the data in preparation for transmission to another device (e.g., over a network to a server) to protect the data while in transit.

While example modifications to example functions are described above in connection with the example control table 302, additional or alternative functions of the MPD 100 may be affected by the example data protector 234. For example, when the restricted data command is detected, the memory controller interface 310 may cause the memory controller 220 to forbid copying of the corresponding data. In such instances, when a non-sensitive command or the protected data command is detected, the memory controller 220 is not affected and allows copying of the corresponding data.

Additionally or alternatively, when either the restricted data command or the protected data command is detected, the print controller interface 306 may cause the print controller 210 to facilitate printing of a security mark such as, for example, a watermark indicative of an identity of the media processing device 100, the current user of the media processing device 100 (e.g., based on the user authenticator 230), a time and date at which the printing occurred, and/or any other suitable information.

Figure 5:
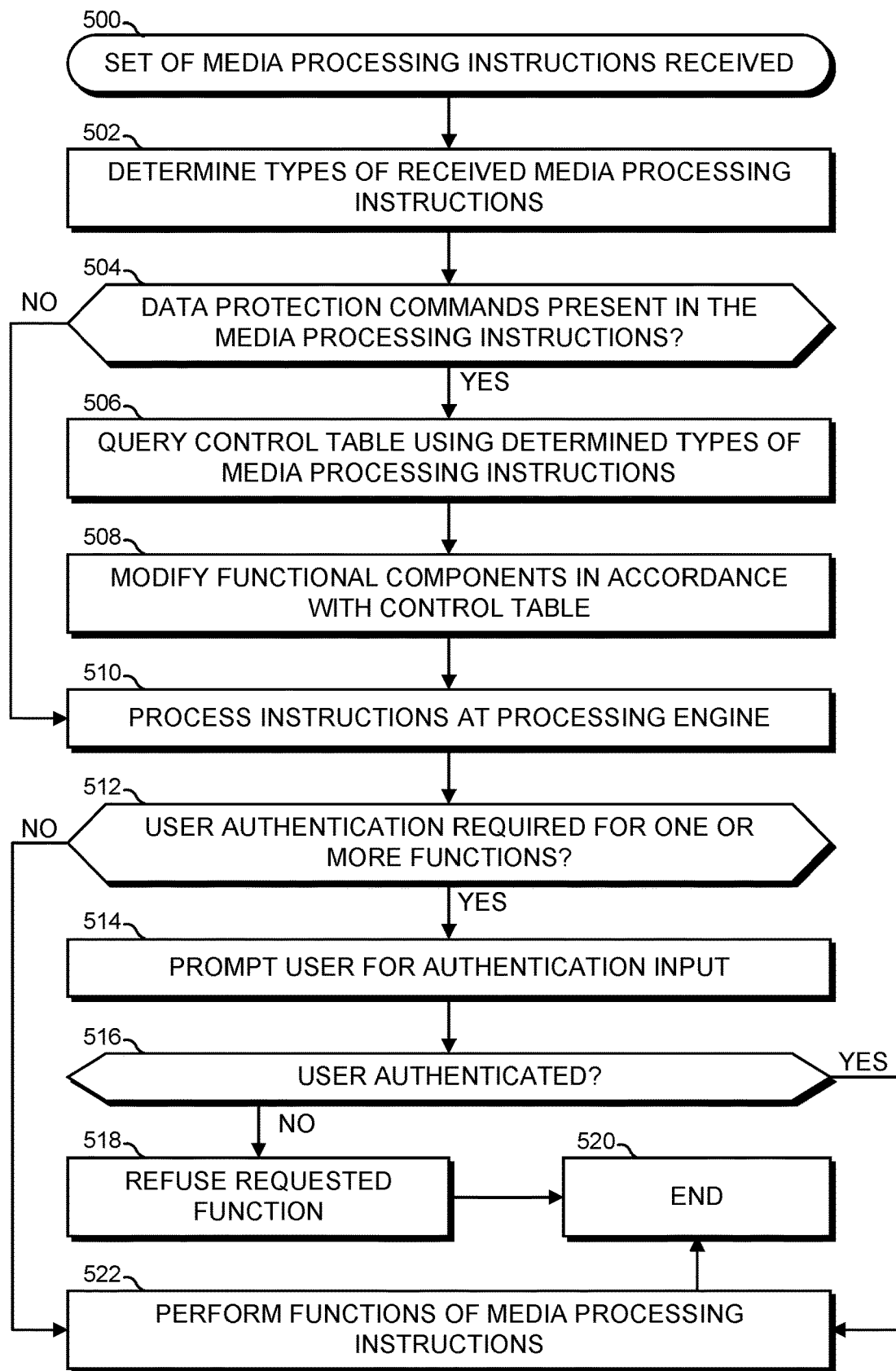
FIG. 5 is a flowchart representative of example operations that may be executed to implement the example media processing device of FIGS. 1 and/or 2.

FIG. 5 is a flowchart representative of an example method performed by the example MPD 100 of FIGS. 1-3. In the example of FIG. 5, media processing instructions are received at the MPD 100 via, for example, one of the communication interfaces 206 (block 500). The received media processing instructions are, for example, print instructions and/or encode instructions including commands and data. In some instances, the data that accompanies the commands is representative of sensitive information over which the provider (e.g., sender or generator) of the media processing instructions desires one or more protections. The example method of FIG. 5 enables the provider of the media processing instructions to include one or more type of data protection commands in the media processing instructions, such as a protected data command or a restricted data command. Alternatively, if the provider of the media processing instructions does not desire additional protection over the data, the provider does not include a data protection command.

In the example of FIG. 5, the command detector 300 of the data protector 234 analyzes the media processing instructions to determine the types of the commands thereof (block 502). To do so, the example data protector 234 determines whether each command is a protected data command (e.g., ^PD), a restricted data command (e.g., ^RD), or a non-sensitive command (^FD). While the illustrated example is configured to identity these commands, additional or alternative types of data protection commands are possible.

If at least one of the commands in the media processing instructions is a data protection command (block 504), the command detector 300 queries the control table 302 to obtain a plurality of values for a plurality of functions according to which type of data protection command was detected (block 506). In the illustrated example, when more than one data protection command is detected, the most protective (e.g., according to a hierarchy stored in the control table 302) set of values are returned by the control table 302 for use in connection with the corresponding media processing instructions (e.g., for a print job).

In the example of FIG. 5, at least one of the plurality of values returned by the control table 302 is a modification to a corresponding function of the MPD 100 relative to the function when no data protection command is present in the media processing instructions. As an example modification to a function when the detected data protection command is the protected data command, the memory controller interface 310 causes the memory controller 220 to require user authentication to store the image of the label in the image storage 222, rather than the memory controller 220 storing an image of a label in the image storage 222 (as would occur in the absence of a data protection command). As another example modification to a function when the detected protection command is the restricted data command, the memory controller interface 310 causes the memory controller 220 to prohibit storage of the image in the image storage 222 rather than the memory controller 220 storing an image of a label in the image storage 222 (as would occur in the absence of a data protection command). As another example modification to a function when the detected protection command is either the protected data command or the restricted data command, the memory controller interface 310 causes the memory controller 220 to delete data of the media processing instructions immediately after the processing engine 232 has processed the instructions, rather than the data remaining in the memory 220 (as would occur in the absence of a data protection command). Additional example modifications to functions relative to default or current functionality (as is listed in the Non-Sensitive column of FIG. 4) are described above in connection with FIG. 4.

In the example of FIG. 5, one or more of the interfaces of the function manager 304 modifies a respective function in accordance with the plurality of values received from the control table 302 (block 508). In the illustrated example, the modifications implemented by the function manager 304 apply to the print job corresponding to the media processing instructions. After that print job is performed, the modifications expire and the default or previous functionalities (i.e., the functions associated with non-sensitive information) resume.

Referring back to block 504 of FIG. 5, if the command detector 300 does not detect a data protection command, control passes to block 510 at which the processing engine processes the received media instructions. Alternatively, control arrives at block 510 from block 508. When the media processing instructions are print instructions, the processing engine 232 renders an image according to the commands and data of the print instructions and the print controller 210 controls the conveyance system 212 and the printhead 212 to generate indicia on media based on the image. When the media processing instructions are encode instructions, the processing engine 232 processes the same and the encoder controller 218 controls the conveyance system 212 and the encoder 216 to read from and/or write to a transponder in the encoding area of the MPD 100.

In the example of FIG. 5, the components of the operating system 200 perform respective functions in accordance with the media processing instructions and the values received from the control table 302 (or default values). As described above, in some instances, one or more functions are dependent on whether a user of the MPD 100 is authenticated. If such functions are encountered (block 512), the user authenticator 230 causes a prompt for user input to be generated by one or more of the I/O interfaces 208 (block 514). With the received input, the user authenticator 230 determines whether the user is an authorized user and, in some examples, an authority level of the user (516). If the user is not authenticated, the corresponding function (e.g., a request to modify or view a stored image) is refused or prohibited (block 518) and the example of FIG. 5 ends (block 520). If the user is authenticated, the corresponding function is performed (block 522) and the example of FIG. 5 ends (block 520).

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by some blocks of the diagrams, such as the operating system 200 and the components thereof, are implemented by hardware, software, firmware, and/or any combination of hardware, software and/or firmware. In examples disclosed herein, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A media processing device comprising:
a non-transitory computer-readable medium storing code; and
a processing device programmed to execute the code to:
determine whether a media processing instruction includes a non-sensitive command or a data protection command;
in response to the non-sensitive command, the processing device executes the non-sensitive command to perform a function; and
in response to the data protection command, the processing device modifies the function to provide protection to the data.

2. The media processing device of claim 1, wherein the media processing device is a printer and when the data protection command is encountered in connection with the media processing instruction, the function prohibits use of the data except for printing in response to the media processing instruction.

3. The media processing device of claim 2, wherein, after the printer prints the data, the data is erased from the printer to prevent subsequent reading or retrieval of the data from the printer.

4. The media processing device of claim 1, wherein the media processing device is a printer and the media processing instruction is an encode instruction, and when the data protection command is encountered in connection with the encode instruction, the function prohibits use of the data except for encoding the data into a radio frequency identification (RFID) transponder embedded in media to be output by the printer.

5. The media processing device of claim 4, wherein after the printer encodes the data to memory of the RFID transponder embedded in media output by the printer, the data is deleted from the printer to prevent access or retrieval of the sensitive information from the printer.

6. The media processing device of claim 1, wherein the media processing device is a printer and when the data protection command is encountered, the function deletes or redacts portions of a tracking log associated with the data that is maintained by the printer.

7. The media processing device of claim 1, wherein the media processing device is a printer and when the data protection command is encountered, the function denies requests to modify a format of a print job or an image to be rendered by the printer using the data in response to the media processing instruction.

8. The media processing device of claim 7, wherein, when the data protection command is encountered, the printer logs unauthorized attempts to modify the format or access the data.

9. The media processing device of claim 8, wherein the printer logs details associated with the unauthorized attempts including at least one of a date, a time, or a user identity.

10. The media processing device of claim 1, wherein the media processing device outputs media based on the media processing instruction and includes a watermark on the media indicative of at least one of an identity of the media processing device, a user of the media processing device that initiated the media processing instruction, or a time and date at which the media was output.

11. The media processing device of claim 1, wherein the function is modified in accordance with a value received from a control table.

12. A method performed by a media processing device, the method comprising:
determining whether a media processing instruction includes a non-sensitive command or a data protection command;
in response to the non-sensitive command, executing the non-sensitive command to perform a function; and
in response to the data protection command, modifying the function to provide protection to the data.

13. The method of claim 12, wherein the media processing device is a printer and when the data protection command is encountered in connection with the media processing instruction, prohibiting use of the data by the function except for printing in response to the media processing instruction.

14. The method of claim 13, wherein, after the printer prints the data, erasing the data from the printer to prevent subsequent reading or retrieval of the data from the printer.

15. The method of claim 13, wherein the media processing device is a printer and the media processing instruction is an encode instruction, and when the data protection command is encountered in connection with the encode instruction, prohibiting use of the data by the function except for encoding the data into a radio frequency identification (RFID) transponder embedded in media to be output by the printer.

16. The method of claim 15, wherein after the printer encodes the data to memory of the RFID transponder embedded in media output by the printer, deleting the data from the printer by the function to prevent access or retrieval of the sensitive information from the printer.

17. The method of claim 13, wherein the media processing device is a printer and when the data protection command is encountered, deleting or redacting, by the function, portions of a tracking log associated with the data that is maintained by the printer.

18. The method of claim 13, wherein the media processing device is a printer and when the data protection command is encountered, denying, by the function, requests to modify a format of a print job or an image to be rendered by the printer using the data in response to the media processing instruction.

19. The media processing device of claim 18, wherein, when the data protection command is encountered, the printer logs unauthorized attempts to modify the format or access the data.

* * * * *